United States Patent
Greenwood (10) Patent No.: US 11,027,667 B2
(45) Date of Patent: Jun. 8, 2021

(54) DISPLAY METHOD AND APPARATUS

(71) Applicant: JAGUAR LAND ROVER LIMITED, Warwickshire (GB)

(72) Inventor: Jeremy Greenwood, Coventry (GB)

(73) Assignee: JAGUAR LAND ROVER LIMITED, Whitley (GB)

( * ) Notice: Subject to any disclaimer, the term of this patent is extended or adjusted under 35 U.S.C. 154(b) by 0 days.

(21) Appl. No.: 16/172,964

(22) Filed: Oct. 29, 2018

(65) Prior Publication Data

US 2019/0126851 A1 May 2, 2019

(30) Foreign Application Priority Data

Nov. 2, 2017 (GB) .................................. 1718176.9

(51) Int. Cl.
*B60R 11/04* (2006.01)
*B60K 35/00* (2006.01)
(Continued)

(52) U.S. Cl.
CPC .............. *B60R 11/04* (2013.01); *B60K 35/00* (2013.01); *B60R 1/00* (2013.01); *B60R 1/002* (2013.01); *G06T 3/4038* (2013.01); *H04N 7/181* (2013.01); *B60K 2370/152* (2019.05); *B60K 2370/176* (2019.05); *B60K 2370/1868* (2019.05); *B60K 2370/193* (2019.05); *B60K 2370/195* (2019.05);
(Continued)

(58) Field of Classification Search
CPC ........ B60R 11/04; H04N 7/181; G06T 3/4038
See application file for complete search history.

(56) References Cited

U.S. PATENT DOCUMENTS 9,558,409 B2 * 1/2017 Pliefke ............... G06K 9/00798
9,779,313 B2 * 10/2017 Pliefke ............... G06K 9/00805
(Continued)

FOREIGN PATENT DOCUMENTS

GB        2529408 A       2/2016
WO    2017020898 A1       2/2017

OTHER PUBLICATIONS

Combined Search and Examination Report under Sections 17 and 18(3) for Application No. GB 1718176.9 dated Apr. 27, 2018.
(Continued)

*Primary Examiner* — Irfan Habib
(74) *Attorney, Agent, or Firm* — Carlson, Gaskey & Olds (57) ABSTRACT

The present disclosure relates to a controller for generating a composite image (IMG3) of a region behind a towing vehicle (V). The controller is operable to receive a towing vehicle image data (DV1) from a towing vehicle camera (C1); and a trailer image data (DV2) from a trailer camera (C2). The controller combines the towing vehicle image data (DV1) and the trailer image data (DV2) to generate a composite image data (DV3) corresponding to a composite image (IMG3). The controller is operable to output the composite image data (DV3). The controller is operable selectively to enable and/or disable the output of the composite image data (DV3). The controller is configured to monitor a status of a turn signal indicator. The controller is configured to disable the output of the composite image data (DV3) when the turn signal indicator is activated; and/or enable the output of the composite image data (DV3) when the turn signal indicator is de-activated.

16 Claims, 4 Drawing Sheets

(51) Int. Cl.
*G06T 3/40* (2006.01)
*B60R 1/00* (2006.01)
*H04N 7/18* (2006.01)

(52) U.S. Cl.
CPC ...... *B60K 2370/21* (2019.05); *B60K 2370/52* (2019.05); *B60R 2300/105* (2013.01); *B60R 2300/303* (2013.01); *B60R 2300/60* (2013.01); *B60R 2300/8066* (2013.01); *G06T 2207/30252* (2013.01)

(56) References Cited

U.S. PATENT DOCUMENTS

| | | | | |
|---|---|---|---|---|
| 9,796,228 | B2* | 10/2017 | Hu | B60Q 5/00 |
| 10,035,457 | B2* | 7/2018 | Singh | B62D 15/0265 |
| 10,073,451 | B2* | 9/2018 | Dotzler | G05D 1/0055 |
| 10,089,541 | B2* | 10/2018 | Pliefke | G06K 9/00798 |
| 10,119,812 | B2* | 11/2018 | Singh | G01S 19/42 |
| 10,392,023 | B2* | 8/2019 | Maskell | B60W 40/12 |
| 10,434,945 | B2* | 10/2019 | Loehr | B60R 1/00 |
| 10,440,249 | B2* | 10/2019 | Dornblut | B60R 11/04 |
| 10,710,496 | B2* | 7/2020 | Dixon | B60Q 1/305 |
| 10,730,435 | B2* | 8/2020 | Lonascu | B60D 1/245 |
| 2015/0115571 | A1* | 4/2015 | Zhang | H04N 7/183 |
| | | | | 280/477 |
| 2015/0149040 | A1* | 5/2015 | Hueger | B62D 15/028 |
| | | | | 701/41 |
| 2016/0366336 | A1* | 12/2016 | Kuehnle | H04N 5/23238 |
| 2018/0141496 | A1* | 5/2018 | Loehr | G06K 9/00671 |

OTHER PUBLICATIONS

Will Halloway, Nov. 9, 2015, "A Land Rover Towing Revolution," Landrover.co.uk [online], Available from https://www.landrover.co.uk/explore-land-rover/one-life/technology/transparent-trailer-cargo-sense.html, [Accesssed Apr. 25, 2018].

* cited by examiner

DISPLAY METHOD AND APPARATUS

CROSS REFERENCE TO RELATED APPLICATION

This application claims priority to United Kingdom Application No. GB 1718176.9 filed on 2 Nov. 2017.

TECHNICAL FIELD

The present disclosure relates to a display method and apparatus. More particularly, but not exclusively, the present disclosure relates to a controller for controlling the output of a composite image generated by combining two or more sets of image data. The present disclosure relates to a method of controlling the output of a composite image.

BACKGROUND

It is known to use cameras on a vehicle and to display images from those cameras to assist the driver. For example, it is known to provide a rear-facing camera in a bumper of the vehicle to facilitate parking the vehicle. The images can provide a useful source of additional information to the driver, for example to identify potential obstacles. In order to facilitate manoeuvring a towed vehicle, such as a trailer, it is known to provide cameras on the towing vehicle and the trailer. A camera may, for example, be provided at the rear of the trailer to facilitate reversing the trailer. It is known from the Applicant's earlier application GB1414632.8 to combine images from a camera provided on the vehicle with images from a camera provided on the trailer. The resulting composite image may be output to provide a driver aid. The present invention(s) relates to developments and modifications of these types of display systems.

SUMMARY OF THE INVENTION

Aspects and embodiments of the present invention relate to a controller, a display system, a vehicle and a method as claimed in the appended claims.

According to a further aspect of the present invention there is provided a controller for generating a composite image of a region behind a towing vehicle, the controller operable to:
a. receive a towing vehicle image data from a towing vehicle camera;
b. receive a trailer image data from a trailer camera;
c. combine the towing vehicle image data and the trailer image data to generate a composite image data corresponding to a composite image; and
d. output the composite image data;
e. wherein the controller is operable selectively to enable and/or disable the output of the composite image data. The controller may control the output of image data to provide an effective driver assistance aid. The controller may be disposed in a towing vehicle connected to a trailer or other towed vehicle. The output of the composite image may be selectively enabled and/or disabled to aid manoeuvring of the towing vehicle and the trailer.

Disabling the output of the composite image data may comprise interrupting the generation of the composite image data. Alternatively, disabling the output of the composite image data may comprise inhibiting the output of the composite image data generated by combining the towing vehicle image data and the trailer image data. Disabling the output of the composite image data may further comprise not displaying the composite image corresponding to the composite image data on a display.

The controller may be operable to receive a user input for selectively enabling and/or disabling the output of the composite image data.

The user input may be generated by activating of an input device. The input device may be a virtual device, for example displayed on a touch screen. Alternatively, the input device may, for example, comprise a switch, a button or a knob. The input device may be disposed on a centre console, a steering wheel or a steering wheel column.

The controller may be configured to output the towing vehicle image data or the trailer image data when the output of the composite image data is disabled.

The controller may be configured to operate in conjunction with a turn signal indicator. The controller may be configured to determine when the turn signal indicator is activated and/or deactivated.

The controller may be configured to monitor a status of a turn signal indicator. The controller is configured to disable the output of the composite image data when the turn signal indicator is activated; and/or to enable the output of the composite image data when the turn signal indicator is de-activated.

The turn signal indicator may be activated for a first time to signal an overtaking manoeuvre, for example to indicate that the vehicle is pulling out of a lane to overtake a vehicle in front. In dependence on activation of the turn signal indicator, the controller may disable the output of the composite image. The turn signal indicator may be activated for a second time to signal that that the vehicle is completing the overtaking manoeuvre, for example to indicate that the vehicle is pulling back into the lane in front of the other vehicle. The turn signal indicator may be activated in an opposite sense (i.e. to signal a turn in the opposite direction to the first time) when it is activated for the second time. The controller may be configured to enable the output of the composite image in dependence on activation of the turn signal indicator for the second time. Alternatively, the controller may be configured to enable the output of the composite image only when the turn signal indicator is de-activated for the second time. The de-activation of the turn signal indicator for the second time may provide a confirmation that the overtaking manoeuvre is complete.

The controller may be configured to monitor a status of a towing vehicle transmission to determine when a reverse drive is engaged and/or disengaged. The controller may be configured to disable the output of the composite image data when the reverse drive is engaged; and/or to enable the output of the composite image data when the reverse drive is dis-engaged.

Alternatively, or in addition, the controller may be configured to disable the output of the composite image data for a predetermined time period.

The controller may be configured to disable the output of the composite image data in dependence on detection of another vehicle adjacent to (alongside) the towing vehicle and/or adjacent to (alongside) a trailer connected to the towing vehicle.

According to another aspect of the present invention there is provided a display system comprising a controller as described herein. The display system may comprise a towing vehicle camera for outputting towing vehicle image data; and a trailer camera for outputting trailer image data.

The display system may further comprise a display screen and outputting the composite image data may comprise displaying a composite image corresponding to the composite image data on the display screen.

When the output of the composite image data is disabled, the display system may be operable to display a trailer image corresponding to the trailer image data on the display screen.

According to another aspect of the present invention there is provided a towing vehicle comprising a display system as described herein.

According to another aspect of the present invention there is provided a method of generating a composite image of a region behind a towing vehicle, the method comprising:
f. using a towing vehicle camera to capture a towing vehicle image;
g. using a trailer camera to capture a trailer image;
h. combining the towing vehicle and trailer images to form a composite image; and
i. outputting the composite image;
j. wherein the method comprises selectively enabling and/or disabling the output of the composite image.

Disabling the output of the composite image data may comprise inhibiting or interrupting the generation of the composite image data.

Disabling the output of the composite image data may comprise interrupting the generation of the composite image data. Alternatively, disabling the output of the composite image data may comprise inhibiting the output of the composite image data generated by combining the towing vehicle image data and the trailer image data.

The method may comprise outputting the towing vehicle image or the trailer image when the output of the composite image is disabled.

The method may comprise monitoring a status of a turn signal indicator. The method may comprise disabling the output of the composite image when the turn signal indicator is activated; and/or enabling the output of the composite image when the turn signal indicator is de-activated.

The method may comprise monitoring a status of a towing vehicle transmission to determine when a reverse drive is engaged and/or disengaged. The method may comprise disabling the output of the composite image when the reverse drive is engaged; and/or enabling the output of the composite image when the reverse drive is dis-engaged.

The method may comprise disabling output of the composite image for a predetermined time period.

The method may comprise disabling the output of the composite image in dependence on detection of another vehicle adjacent to the towing vehicle and/or adjacent to a trailer connected to the towing vehicle.

Outputting the composite image data may comprise displaying the composite image on a display screen.

When the output of the composite image data is disabled, the method may comprise displaying the trailer image on a display screen.

According to a further aspect of the present invention there is provided a non-transitory computer-readable medium having a set of instructions stored therein which, when executed, cause a processor to perform the method described herein.

Any control unit or controller described herein may suitably comprise a computational device having one or more electronic processors. The system may comprise a single control unit or electronic controller or alternatively different functions of the controller may be embodied in, or hosted in, different control units or controllers. As used herein the term "controller" or "control unit" will be understood to include both a single control unit or controller and a plurality of control units or controllers collectively operating to provide any stated control functionality. To configure a controller or control unit, a suitable set of instructions may be provided which, when executed, cause said control unit or computational device to implement the control techniques specified herein. The set of instructions may suitably be embedded in said one or more electronic processors. Alternatively, the set of instructions may be provided as software saved on one or more memory associated with said controller to be executed on said computational device. The control unit or controller may be implemented in software run on one or more processors. One or more other control unit or controller may be implemented in software run on one or more processors, optionally the same one or more processors as the first controller. Other suitable arrangements may also be used.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the present invention will now be described, by way of example only, with reference to the accompanying figures, in which.

DETAILED DESCRIPTION

A rear-view display system 1 in accordance with an embodiment of the present invention will now be described with reference to the accompanying figures. The rear-view display system 1 is intended for use in a towing vehicle V connected to a towed vehicle T. The towed vehicle T in the present embodiment comprises a trailer T. The towing vehicle V has a first longitudinal axis X1, and the trailer T has a second longitudinal axis X2.

Figure 1:
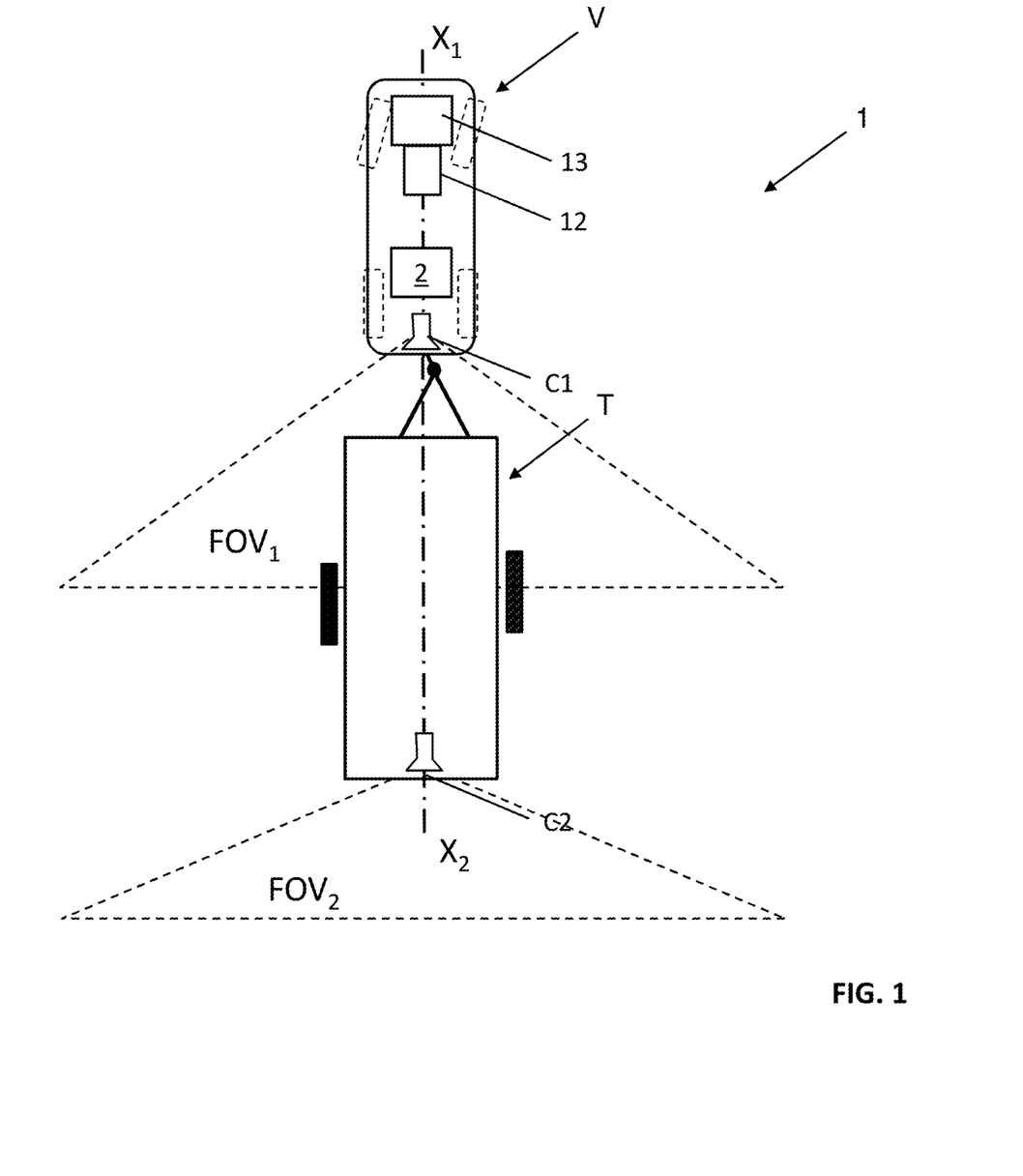
FIG. 1 shows a vehicle and a trailer incorporating a rear-view display system in accordance with an embodiment of the present invention.

As shown in FIG. 1, the rear-view display system 1 comprises a controller 2, a towing vehicle camera C1 and a trailer camera C2. The towing vehicle camera C1 is disposed at the rear of the towing vehicle V and is oriented in a rear-facing direction. The towing vehicle camera C1 has an optical axis substantially parallel to the first longitudinal axis X1. The towing vehicle camera C1 has a first field of view FOV1 which encompasses a region to the rear of the towing vehicle V. In use, the towing vehicle camera C1 captures vehicle image data DV1 corresponding to a vehicle image IMG1 of a region behind the towing vehicle V. The trailer camera C2 is disposed at the rear of the trailer T and is oriented in a rear-facing direction. The trailer camera C2 has an optical axis substantially parallel to the second longitudinal axis X2. The trailer camera C2 has a second field of view FOV2 which encompasses a region to the rear of the trailer T. In the present embodiment, the trailer camera C2 has a horizontal field of view of approximately 170°. In use, the trailer camera C2 captures trailer image data DV2 corresponding to a trailer image IMG2 of a region behind the trailer T.

Figure 2:
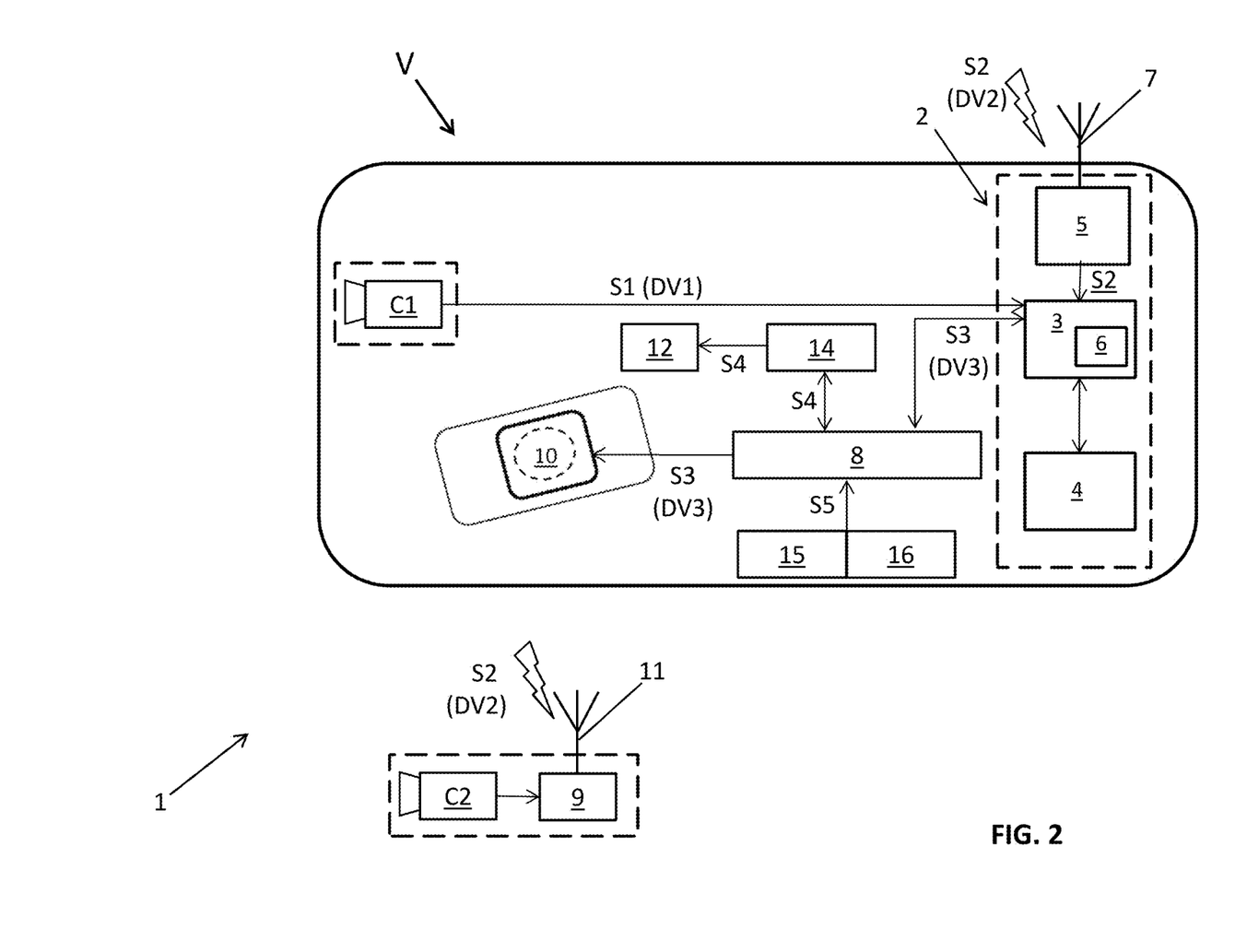
FIG. 2 shows a schematic representation of the components of the rear-view display system shown in FIG. 1.

In the present embodiment, the controller 2 is disposed in the towing vehicle V. As shown in FIG. 2, the controller 2 comprises a processor 3 connected to a system memory 4, and a wireless receiver 5. The processor 3 is configured to execute a set of software instructions held in the system memory 4 and implements an image processing module (denoted by the reference numeral 6). The processor 3 is connected to a communication bus 8, such as the towing vehicle CAN bus, for communicating with other towing vehicle systems. The wireless receiver 5 comprises a first antenna 7. The trailer camera C2 is connected to a wireless transmitter 9 having a second antenna 11. In use, the wireless transmitter 9 transmits the trailer image data DV2 captured by the trailer camera C2 to the wireless receiver 5. The towing vehicle V comprises a display screen 10 on which the vehicle and trailer images received from the respective vehicle and trailer cameras C1, C2 can be selectively displayed.

The vehicle and trailer cameras C1, C2 are both rear-facing digital cameras for generating video images. The vehicle and trailer cameras C1, C2 each comprise a wide-angle lens to provide a viewing angle of approximately 130°. The towing vehicle camera C1 is mounted centrally at the rear of the towing vehicle V above a rear license plate (not shown) and, in the present embodiment, can selectively function as a reversing camera to provide a parking aid when there is no trailer T coupled to the towing vehicle V. The trailer camera C2 is mounted centrally at the rear of the trailer T. The vehicle and trailer cameras C1, C2 are arranged at approximately the same vertical height above ground level. In alternate arrangements, the vehicle and trailer cameras C1, C2 can be offset from each other in a vertical and/or transverse direction. The image processing module 6 can be configured to correct for any such positional offset. Equally, the image processing module 6 can be configured to correct for an angular offset between the vehicle and trailer cameras C1, C2, for example if one or both of the vehicle and trailer cameras C1, C2 is angularly offset from the respective first and second longitudinal axes X1, X2.

The towing vehicle camera C1 outputs a first signal S1 comprising said vehicle image data DV1 corresponding to the vehicle image IMG1. The first signal S1 is published to the communication bus 8 and provides a first input for the image processing module 6. The trailer camera C2 outputs said trailer image data DV2 corresponding to the trailer image IMG2. The second signal S2 is transmitted by the wireless transmitter 9 to the wireless receiver 5 to provide a second input for the image processing module 6. The wireless transmitter 9 can transmit the second signal S2 using a suitable wireless communication standard, such as Wi-Fi®. In a variant, the second signal S2 could be transmitted over a wired connection between the trailer T and the towing vehicle V.

Figure 3A:
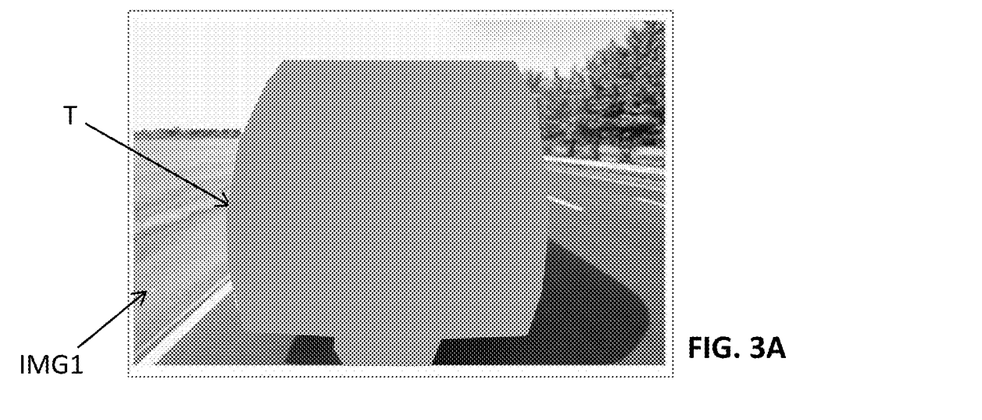
FIG. 3A shows a towing vehicle image from a towing vehicle camera disposed on the towing vehicle.
Figure 3B:
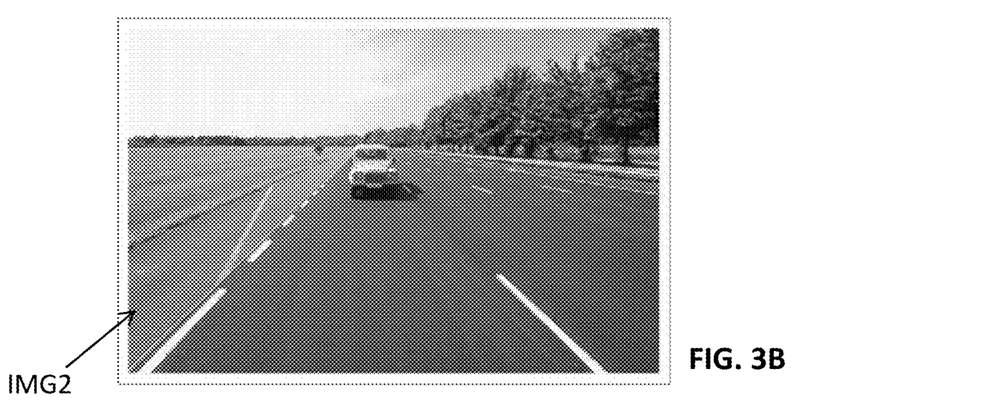
FIG. 3B shows a trailer image from a trailer camera disposed on the trailer.
Figure 3C:
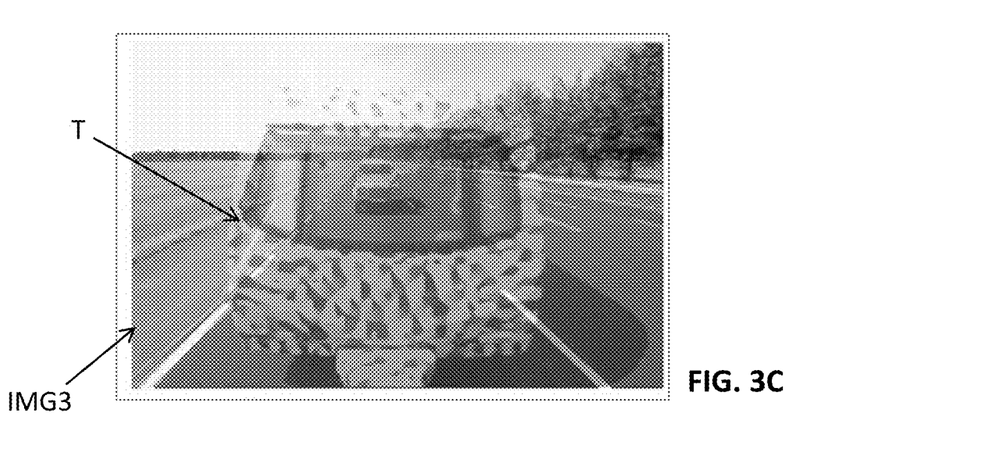
FIG. 3C shows a composite image generated by combining the towing vehicle image and the trailer image shown in FIGS. 3A and 3B.

The image processing module 6 is configured to combine the vehicle image data DV1 and the trailer image data DV2 to generate a composite image data DV3. FIG. 3A shows an exemplary towing vehicle image DV1 generated by the towing vehicle camera C1; and FIG. 3B shows an exemplary trailer image DV2 generated by the trailer camera C2. The composite image data DV3 corresponds to a composite image IMG3 formed from said vehicle and trailer images IMG1, IMG2. The image processing module 6 modifies the vehicle image data DV1 such that the vehicle image IMG1 will be rendered as a semi-transparent image. For example, the image processing module 6 can modify an alpha channel or an index transparency of the vehicle image data DV1. The vehicle image data DV1 can be modified to provide a transparency of 25%, for example. The vehicle image data DV1 and the trailer image data DV2 are combined to generate the composite image data DV3 representing the composite image IMG3. FIG. 3C shows an exemplary composite image IMG3 generated by combining the towing vehicle image DV1 shown in FIG. 3A with the trailer image DV2 shown in FIG. 3B. The composite image IMG3 comprises the trailer image IMG2 as a background element over which the vehicle image IMG1 is overlaid. Significantly, the trailer T (which is present in the vehicle image IMG1, but not the trailer image IMG2) is partially visible in the composite image IMG3 to facilitate determining its relative position to objects and/or other towing vehicles.

When the towing vehicle V and the trailer T are aligned with each other (such that the first and second longitudinal axes X1, X2 are coincident), the vehicle and trailer images IMG1, IMG2 are in respect of the same scene albeit offset from each other due to the longitudinal offset between the vehicle and trailer cameras C1, C2. The image processing module 6 may be configured to implement an image matching procedure to align the vehicle image IMG1 with the trailer image IMG2, for example to compensate for lateral and/or vertical offsets between the vehicle and trailer cameras C1, C2. The image processing module 6 could also be configured to manipulate the vehicle image data DV1 and/or the trailer image data DV2 in dependence on a detected angular offset between the first and second longitudinal axes X1, X2. For example, the image processing module 6 may make allowances for changes in a hitch (articulation) angle between the towing vehicle V and the trailer T. The hitch angle could be determined by analysing the vehicle image IMG1 to track the relative position and/or orientation of a target provided on the trailer T.

The image processing module 6 thereby performs image registration to align the vehicle and trailer images IMG1, IMG2 with each other. The image registration can comprise one or more of the following transforms: image rotation, scaling, cropping, magnification (zooming), skew correction and translation. It will be appreciated that the transform(s) required to match the vehicle and trailer images IMG1, IMG2 depend on the relative positioning of the vehicle and trailer cameras C1, C2. As outlined above, the vehicle image IMG1 data is modified such that the vehicle image IMG1 appears semi-transparent when displayed. The vehicle image IMG1 is then overlaid onto the trailer image IMG2 to form composite image data DV3 corresponding to the composite image IMG3. The composite image may be formed, for example, using alpha-compositing techniques.

In use, the towing vehicle camera C1 generates vehicle image data DV1 comprising the vehicle image IMG1 which includes the trailer T being towed behind the towing vehicle V. The trailer camera C2 outputs trailer image data DV2 comprising the trailer image IMG2. The image processing module 6 implements an image matching procedure to match (align) the vehicle and trailer images IMG1, IMG2. The vehicle image data DV1 and the trailer image data DV2 are combined to form the composite image data DV3. The composite image IMG3 is output as a third signal S3 for display on a display screen 10, such as a liquid-crystal display, provided in the towing vehicle. The display screen 10 can, for example, be provided in a centre console or an instrument cluster.

It has been recognised that in certain scenarios it may be difficult for the driver to judge distances using the composite image IMG3 since this is a combination the vehicle image IMG1 and the trailer image IMG2 which are longitudinally offset from each other. By way of example, the driver may find it difficult to determine the proximity of an object displayed in the composite image IMG3. This shortcoming is evident during a reversing manoeuvre when the towing vehicle V and the trailer T are being reversed. It may be difficult for the driver to determine the distance between the rear of the trailer T and an obstacle, such as a wall, displayed in the composite image IMG3. To overcome this limitation, the processor 3 is configured to inhibit the output of the composite image IMG3 when the towing vehicle V and the trailer T are reversing. The processor 3 is operable to identify when the towing vehicle V and the trailer T are reversing and to output the trailer image IMG2 instead of the composite image IMG3. The driver can more readily assess the proximity of objects in the trailer image IMG2. Thus, by outputting the trailer image IMG2, the processor 3 may facilitate manoeuvring of the towing vehicle V and the trailer T.

As shown in FIG. 2, the towing vehicle V comprises a transmission 12 coupled to a driveshaft of an internal combustion engine 13. The transmission 12 comprises a plurality of drive ratios for controlling the output of torque from the internal combustion engine to a driveshaft coupled to the driven wheels of the towing vehicle V. The drive ratios include a reverse drive for reversing the towing vehicle V. The transmission 12 is automatic or semi-automatic and is controlled by a transmission control module 14 which outputs a transmission control signal S4. The transmission control signal S4 may, for example, be published to the communication bus 8. The transmission 12 is configured to select one of said drive ratios in dependence on said transmission control signal S4. The processor 3 is configured to monitor the transmission signal S4 to determine when the reverse drive is selected. The processor 3 is configured to control the output of the composite image IMG3 in dependence on said transmission control signal S4. In particular, upon detecting the selection of the reverse drive, the processor 3 inhibits the output of the composite image IMG3. In place of the composite image IMG3, the processor 3 outputs the trailer image IMG2 captured by the trailer camera C2. The trailer image IMG2 enables the driver more readily to judge the proximity of objects to the rear of the trailer T, thereby facilitating reversing of the trailer T. In use, the processor 3 may automatically change the output from the composite image IMG3 to the trailer image IMG2 when selection of said reverse drive is identified. It will be understood that a similar control strategy may be implemented if the transmission 12 is a manual transmission and the manual selection of the reverse drive is detected. In a modified arrangement, the processor 3 may be configured to output the vehicle image IMG1 when the reverse drive is selected.

The processor 3 could use one or more techniques to determine when the towing vehicle V and the trailer T are reversing. For example, the processor 3 could monitor a rotational speed of one or more wheels; or monitor a Global Positioning System (GPS) signal. The towing vehicle V may comprise an electric traction motor and the processor 3 could determine a direction of travel in dependence on an operational mode of the electric traction motor.

An additional scenario where the driver may need to accurately judge proximity is when the towing vehicle V and the trailer T are performing an overtaking manoeuvre, for example to pass another vehicle or road user. The overtaking manoeuvre can occur on a road, such as but not limited to, unmarked roads, single lane roads and multilane roads (single carriageways, dual carriageways and motorways). When performing an overtaking manoeuvre on a multi-lane road, the driver must determine when the towing vehicle V and the trailer T are clear of the other vehicle and may safely return to the original lane to complete the overtaking manoeuvre. However, the combination of the vehicle image IMG1 and the trailer image IMG2 may make it difficult for the driver to determine when the trailer T is in front of the other vehicle based on the composite image IMG3. The processor 3 is configured to disable the output of the composite image IMG3 when a manoeuvre signal S5 is received. The manoeuvre signal S5 can be generated by the driver operating a dedicated input device 15 when performing an overtaking manoeuvre. The input device 15 may be in the form of a "Push-to-Pass" button, for example provided on a centre console or a steering wheel of the towing vehicle V. Alternatively, or in addition, the manoeuvre signal S5 may be generated when a turn signal indicator 16, such as a turn signal indicator stalk, is actuated by the driver to operate the indicator lamps to signal an overtaking manoeuvre. Alternatively, or in addition, the manoeuvre signal S5 may be generated automatically via an autonomous driving system or a driver assistance driving system. In dependence on said manoeuvre signal S5, the processor 3 is configured to inhibit the output of the composite image IMG3 when the towing vehicle V and the trailer T are reversing. In place of the composite image IMG3, the processor 3 outputs the trailer image IMG2 captured by the trailer camera C2. In a modified arrangement, the processor 3 may be configured to output the vehicle image IMG1 or may disable the display screen 10 in dependence on said manoeuvre signal S5. The processor 3 may be configured to inhibit the output of the composite image IMG3 for a predetermined time period. The processor 3 may inhibit the output of the composite image IMG3 until the input device 15 is operated again to indicate that the overtaking manoeuvre has been completed (thereby cancelling the inhibit function).

Figure 4A:
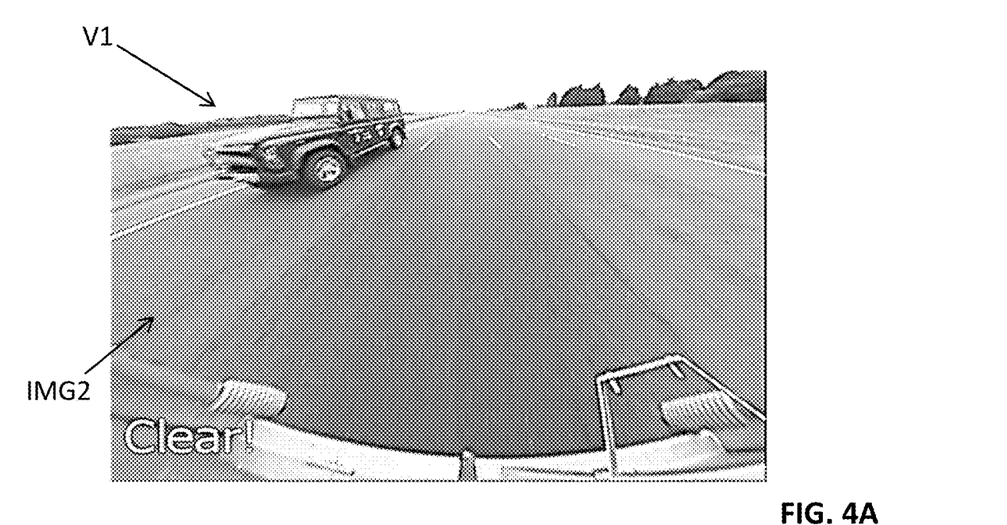
FIG. 4A shows a trailer image from a towed vehicle camera during an overtaking manoeuvre.
Figure 4B:
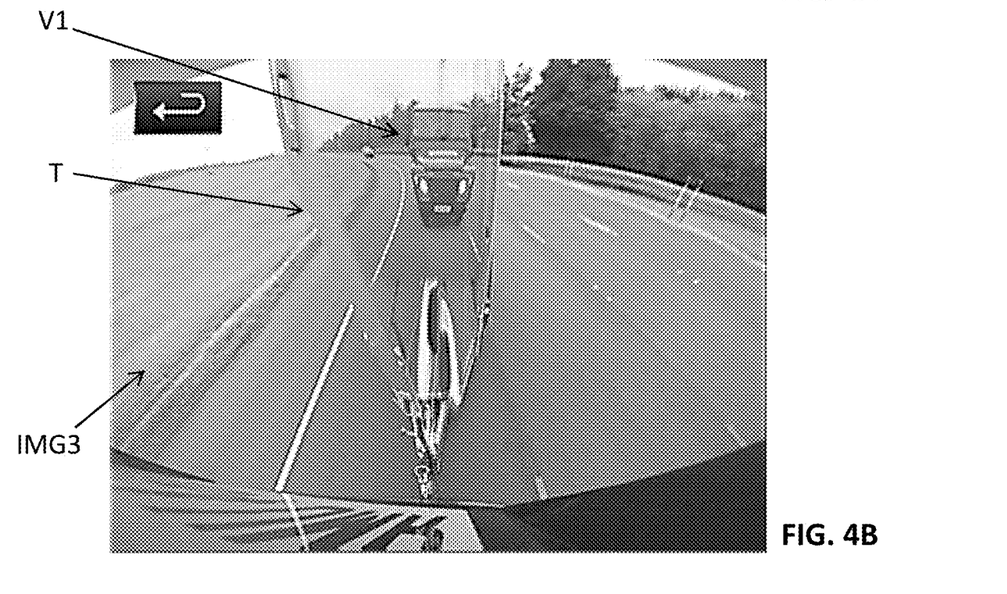
FIG. 4B shows a composite image generated by combining the towing vehicle image and the trailer image when the overtaking manoeuvre is complete.

The operation of the rear-view display system 1 during an overtaking manoeuvre is illustrated in FIGS. 4A and 4B. As shown in FIG. 4A, the output of the composite image IMG3 is inhibited while the overtaking manoeuvre is being performed. Thus, during the overtaking manoeuvre, the trailer image IMG2 is displayed in place of the composite image IMG3. In the illustrated arrangement, a vehicle V1 which is being overtaken by the towing vehicle V and the towed trailer T is visible in the trailer image IMG2. When the overtaking manoeuvre is complete, the processor 3 is configured to output the composite image IMG 3, as illustrated in FIG. 4B. The composite image IMG 3 generated by compositing the vehicle image IMG1 and the trailer image IMG2 comprises both the vehicle V1 being overtaken and the trailer T. A notification may be generated to indicate when the trailer T is clear of the vehicle V1 to provide the driver with an indication that it is safe to pull into the lane in front of the vehicle V1. As illustrated in FIG. 4A, the notification in the present embodiment comprises a message "Clear!" which is output to the display screen 10. The notification may be generated in dependence on one or more sensors disposed on the towing vehicle V and/or the trailer T. The sensor may, for example, comprise one or more of the following: an ultrasonic sensor, a radar sensor, a Lidar ('LIght Detection And Ranging') sensor and an optical sensor.

In a variant, the processor 3 may be configured to determine when an overtaking manoeuvre is taking place and to generate the manoeuvre signal S5 in dependence on said determination. The processor 3 could be configured to inhibit the output of the composite image IMG3 upon determining that an overtaking manoeuvre has been initiated. The processor 3 may, for example, determine that an overtaking manoeuvre has been initiated based on one or more of the following operating parameters: steering angle, acceleration, transmission control signal (selected drive ratio), speed and turn signal indicators. The processor 3 may be configured to enable the output of the composite image IMG3 upon determining that the overtaking manoeuvre has been completed. The processor 3 may be configured to determine that the overtaking manoeuvre is complete based on one or more of said vehicle operating parameters. By way of example, the processor 3 may determine that an overtaking manoeuvre has been initiated based on activation of the turn signal indicators 16. The processor 3 may be configured to inhibit the output of the composite image IMG3 until the turn signal indicator 16 is operated again in the opposite sense (or is operated again and then deactivated) to indicate that the overtaking manoeuvre is completed.

Alternatively, or in addition the processor 3 may be configured to disable the output of the composite image data DV3 in dependence on detection of another vehicle adjacent to the towing vehicle V and/or adjacent to a trailer T connected to the towing vehicle. Using the one or more sensors disposed on the towing vehicle V and/or the trailer T, such as, but not limited to, an ultrasonic sensor, a radar sensor, a Lidar ('LIght Detection And Ranging') sensor and an optical sensor, the processor 3 may be configured to obtain the presence of another vehicle adjacent to the tow vehicle V and/or adjacent to a trailer T. In order to provide the accurate proximity to the adjacent vehicle the output of the composite image IMG3 may be disabled or inhibited.

Disabling or inhibiting the output of the composite image data in general means that the image provided on the display screen 10 is not that corresponding to the composite image data, and is preferably the trailer image IMG2 corresponding to the trailer image data. This may be achieved in any suitable manner. For example, disabling or inhibiting the output of the composite image data may comprise interrupting the generation of the composite image data, so that no composite image data is available. Alternatively, disabling the output of the composite image data may comprise inhibiting the output of the composite image data generated by combining the towing vehicle image data and the trailer image data, i.e. selectively outputting image data corresponding to a different image. Disabling the output of the composite image data may further comprise not displaying the composite image corresponding to the composite image data on a display, for example by making both composite image data and trailer image data available and, at a suitable module or system component, selecting the trailer image data to be presented on the display screen.

In the illustrated example, the towing vehicle V is an automobile (for example a sports utility towing vehicle) and the trailer T is a caravan. It will be appreciated, however, that the apparatus and method(s) described herein are not limited in this respect and could be implemented in other types and categories of towing vehicle and to other types of trailer. The apparatus and method(s) could, for example, be applied to an articulated towing vehicle, a semi-trailer or a tractor-trailer.

It will be appreciated that various modifications may be made to the embodiment(s) described herein without departing from the scope of the appended claims.

The invention claimed is:

1. A controller for generating a composite image of a region behind a towing vehicle, the controller being configured to:
   receive towing vehicle image data from a towing vehicle camera, the towing vehicle image data corresponding to a vehicle image of a region behind the towing vehicle;
   receive trailer image data from a trailer camera, the trailer image data corresponding to a trailer image of a region behind a trailer connected to the towing vehicle;
   combine the towing vehicle image data and the trailer image data to generate composite image data corresponding to a composite image;
   selectively enable and/or disable output of the composite image data;
   monitor a status of a turn signal indicator that is selectively activated to provide an indication of an intended direction of movement of the towing vehicle;
   disable the output of the composite image data when the turn signal indicator is activated such that the controller outputs only the trailer image data to a display to display an image of only a region behind the trailer when the turn signal is activated; and
   enable the output of the composite image data when the turn signal indicator is de-activated such that the controller outputs the composite image data to the display to display the composite image when the turn signal indicator is de-activated.

2. A controller as claimed in claim 1, wherein the controller is operable to receive a user input for selectively enabling and/or disabling the output of the composite image data.

3. A controller as claimed in claim 1, wherein the controller is configured to monitor a status of a towing vehicle transmission to determine when a reverse drive is engaged and/or disengaged.

4. A controller as claimed in claim 3, wherein the controller is configured to disable the output of the composite image data when the reverse drive is engaged and/or to enable the output of the composite image data when the reverse drive is dis-engaged.

5. A controller as claimed in claim 1, wherein the controller is configured to disable the output of the composite image data for a predetermined time period.

6. A controller as claimed in claim 1, wherein the controller is configured to disable the output of said composite image data in dependence on detection of another vehicle adjacent to the towing vehicle and/or adjacent to the trailer.

7. A display system comprising the controller as claimed in claim 1 and the display, wherein the display comprises a display screen.

8. A display system according to claim 7 wherein, when the output of the composite image data is disabled, the display screen is operable to display the trailer image corresponding to the trailer image data on the display screen.

9. A display system as claimed in claim 7 comprising:
the towing vehicle camera for outputting the towing vehicle image data; and
the trailer camera for outputting the trailer image data.

10. A towing vehicle and a trailer comprising a display system as claimed in claim 7.

11. A method of controlling a displayed image of a region behind a towing vehicle, the method comprising:
using a towing vehicle camera to capture a towing vehicle image, the towing vehicle image data corresponding to a vehicle image of a region behind the towing vehicle;
using a trailer camera to capture a trailer image, the trailer image data corresponding to a trailer image of a region behind a trailer connected to the towing vehicle;
combining the towing vehicle image and the trailer image to form a composite image;
selectively enabling and/or disabling output of the composite image;
monitoring a status of a turn signal indicator that is selectively activated to provide an indication of an intended direction of movement of the towing vehicle;
disabling the output of the composite image when the turn signal indicator is activated such that the controller outputs only the trailer image data to a display to display an image of only a region behind the trailer when the turn signal is activated; and
enabling the output of the composite image when the turn signal indicator is de-activated such that the controller outputs the composite image data to the display to display the composite image when the turn signal indicator is de-activated.

12. A method as claimed in claim 11 comprising selectively enabling and/or disabling the output of the composite image in dependence on a user input.

13. A method as claimed in claim 11 comprising
monitoring a status of a towing vehicle transmission to determine when a reverse drive is engaged and/or disengaged; and
disabling the output of the composite image when the reverse drive is engaged and/or enabling the output of the composite image when the reverse drive is disengaged.

14. A method as claimed in claim 11 comprising disabling output of the composite image for a predetermined time period.

15. A method as claimed in claim 11 comprising disabling the output of the composite image in dependence on detection of another vehicle adjacent to the towing vehicle and/or adjacent to the trailer.

16. A non-transitory computer-readable medium having a set of instructions stored therein which, when executed by one or more processors, cause the one or more processors to perform the method claimed in claim 11.

* * * * *